March 3, 1953  M. S. PEARL  2,630,313
COMBINATION INFANT'S SWING AND WEIGHING DEVICE
Filed July 26, 1949
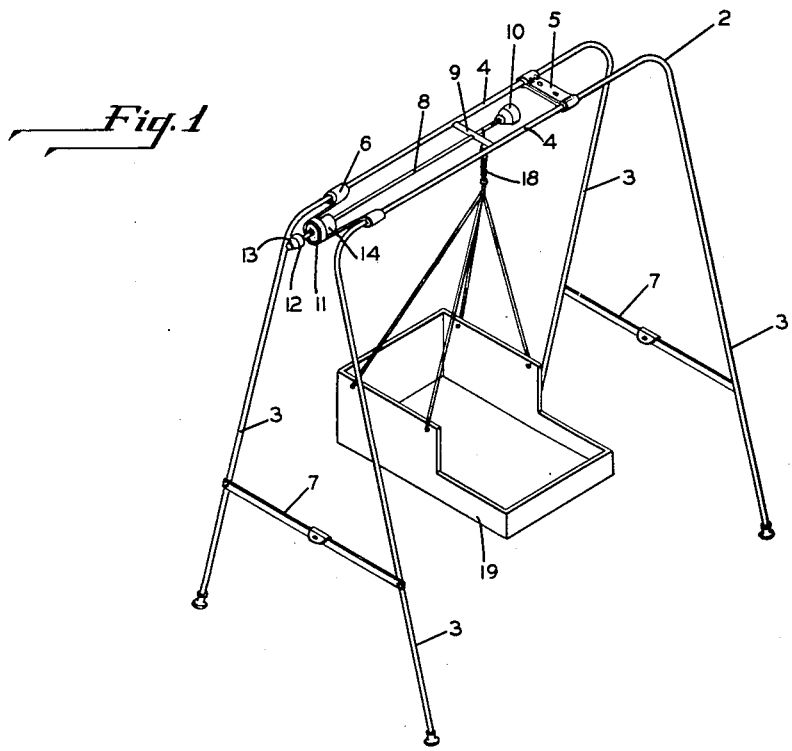
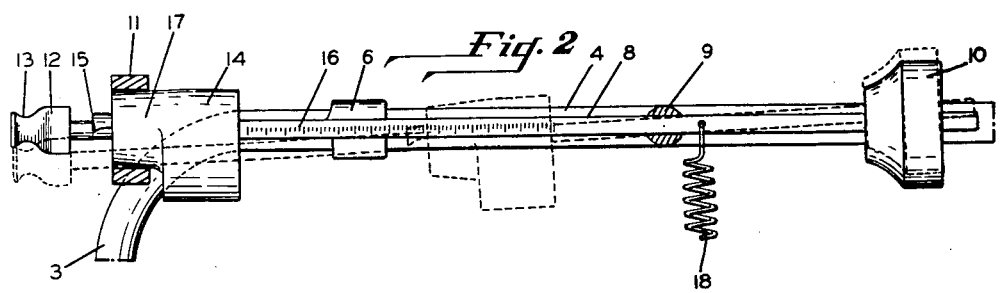
Inventor
MORTON S. PEARL
by George L Herr
ATTORNEY Patented Mar. 3, 1953

2,630,313

UNITED STATES PATENT OFFICE 2,630,313

COMBINATION INFANT'S SWING AND WEIGHING DEVICE

Morton S. Pearl, Lancaster Township, Lancaster County, Pa.

Application July 26, 1949, Serial No. 106,780

3 Claims. (Cl. 265—49)

This invention relates to a combination infant's swing and weighing device and more particularly to a device having a seat or hammock in which the infant can be securely placed to eliminate the danger of the infant falling out. The seat or hammock is suspended from a beam scales in such manner that the scales may be utilized to weigh the infant or it can be maintained in inoperative position so that the infant may swing freely in the receptacle without placing an undue strain on the scales.

In the weighing devices currently used for weighing infants, the infant is placed on a platform or shallow basket on the top of the scales where it is in constant danger of rolling off and becoming injured. Then too the infant will usually kick, jump or squirm causing the scales to fluctuate, thus making it difficult to get an accurate reading of the scales.

In order to overcome the disadvantages of the prior art devices, I have developed a device in which the infant may be placed in a swing suspended from a scales and the scales maintained inoperative until such time as the infant has become sufficiently inactive that the scales will not fluctuate unduly. After weighing, the device may be used as a swing or bouncing device.

It is an object of this invention to provide a combination infant's swing and weighing device.

It is a further object of this invention to provide a combination infant's swing and weighing device in which the poise commonly used to indicate the weight on the scale beam is also used to render the scales inoperative when it is desired to use the device as a swing only.

In order that my invention may be more readily understood it will be described in connection with the attached drawing in which:

Figure 1 is a perspective view of the device of my invention; and

Figure 2 is an enlarged view of the beam scales showing the poise in position for rendering the scales inoperative, and also showing in dotted lines, the position of the poise when indicating the weight of the object being weighed.

Referring to Figure 1 there is shown a frame 2 comprising two U-shaped members disposed side by side in such manner that the legs of the U-shaped members form the supporting legs 3 for the device and the connecting elements 4 of each of the U-shaped members are disposed side by side in close proximity to one another to form the support for the beam scales. The elements 4 are connected by means of two clamp members 5 and 6 which are so constructed that the ends of the clamp members surround the elements 4 so that the elements 4 are free to turn therein. Each end of the clamp members 5 and 6 is provided with vertical bolt holes and the elements 4 are provided with bolt holes which register with the bolt holes in the members 5 and 6. The legs 3 of one U-shaped member are connected with the legs 3 of the other U-shaped member by means of the folding braces 7. The frame 2 may be easily collapsed for storage or transporting by merely removing the bolts from the clamping members 5 and 6 and folding the braces 7. The device may be readily set up by straightening the folding braces 7 and aligning the bolt holes in the members 5 and 6 and the holes in the elements 4. When the bolt holes are in alignment the scales is level, assuming, of course, the device is set up on a level floor.

Disposed between the two elements 4 and pivoted therein is a beam scales 8, the beam of which is disposed parallel to the elements 4 and passes through a cross bar 9, the ends of which are received in openings in the elements 4. These openings are larger in diameter than the diameter of the cross bar 9 so that the same will not bind but will be free to turn therein. The metal defining the bottom of the openings is ground to a sharp edge to reduce the frictional drag to a minimum.

On one side of the cross bar 9 the beam 8 is provided with a counterweight 10, the purpose of which is to balance the scales before the weighing operation is started. The other end of the beam passes through a circular guide 11 which is a part of the clamping member 6 and is positioned midway between the two elements 4. The extreme end of the beam is provided with a tip 12 which is provided with a groove 13 to receive additional weights.

Slidably mounted on the beam 8 between the cross bar 9 and the circular guide 11 is a poise 14 having a small projection 15 which points to the graduations 16 on the scale beam. The intermediate portion 17 of the poise 14 is circular in cross section and tapered slightly from front to back as shown in dotted lines in Figure 2. When the scales is not in use the poise 14 is moved forward so that the portion 17 fits snugly into the circular guide 11 which acts as a support for the end of the beam and renders the scales inoperative.

Secured to the beam 8 immediately back of the cross bar 9 is a coil spring 18 from which is suspended a swing or hammock 19 suitable for supporting an infant safely.

In the operation of my device, the same is set up as shown in Figure 1 with the round portion 17 of the poise 14 in engagement with the circular guide 11 so that the scale beam 8 is firmly held in position. The infant to be weighed is placed in the basket or hammock 19 and allowed to swing or bounce as desired. When it is desired to weigh the infant the poise 14 is moved back along the scale beam 8 until the same is balanced. The balanced position is indicated by the beam passing through the center of the circular guide 11.

After the weighing operation is completed the poise 14 is again moved into position in engagement with the circular guide 11 and the device may be used as a swing.

It will be clear from the above description that I have developed a combination infant's swing and weighing device in which the infant can be safely placed for weighing and thereafter the device may be used as a swing.

While I have illustrated and described a preferred embodiment of my invention, it will be understood that the same is not so limited but may be otherwise practiced within the scope of the following claims.

I claim:

1. A combination swing and weighing apparatus, comprising a supporting structure, a beam supported on the supporting structure, a receptacle suspended from said beam, a ring through which said beam passes, and a poise slidable along said beam to indicate the weight of an object supported by the beam, said poise being so shaped as to fit in said ring to render the weighing device inoperative.

2. A combination swing and weighing apparatus, comprising a collapsible supporting structure, a beam supported on the supporting structure, a receptacle suspended from said beam, a guide through which said beam passes, and a poise slidable along said beam, said poise being so shaped as to fit into engagement with said guide to support the beam in stationary position when the weighing apparatus is not in use.

3. A weighing apparatus, the elements comprising a support, a beam mounted on said support, a circular guide through which said beam passes, said circular guide being attached to said support, a poise slidable along said beam, said poise being so shaped as to fit into engagement with said circular guide to support the beam when the weighing apparatus is not in use.

MORTON S. PEARL.

REFERENCES CITED

The following references are of record in the file of this patent:

UNITED STATES PATENTS

| Number | Name | Date |
|---|---|---|
| 7,562 | Houston | Aug. 13, 1850 |
| 519,593 | Seaberg | May 8, 1894 |
| 1,755,478 | Jaenichen | Apr. 22, 1930 |
| 1,984,606 | Thomas | Dec. 18, 1934 |